United States Patent [19]

Richardson et al.

[11] 4,195,325
[45] Mar. 25, 1980

[54] MEANS FOR PROTECTING HAZARDOUS AREAS AGAINST ELECTRICAL FAULTS

[75] Inventors: Edward G. Richardson, Bath; Keith H. Williamson, Fetcham, both of England

[73] Assignee: National Research Development Corporation, London, England

[21] Appl. No.: 860,219

[22] Filed: Dec. 13, 1977

[51] Int. Cl.² .............. H02H 3/20; H02H 7/20
[52] U.S. Cl. .................. 361/56; 361/91; 361/111
[58] Field of Search .............. 361/56, 54, 55, 57, 361/18, 111, 110, 91, 86, 88, 89, 90

[56] References Cited

U.S. PATENT DOCUMENTS

| | | | |
|---|---|---|---|
| 3,449,634 | 6/1969 | Hung | 361/56 |
| 3,496,415 | 2/1970 | Ruthenberg et al. | 361/57 |
| 3,727,105 | 4/1973 | Hochheiser | 361/55 |
| 3,729,652 | 4/1973 | St. Clair | 361/56 |

FOREIGN PATENT DOCUMENTS 1181853  2/1970  United Kingdom .
1353232  5/1974  United Kingdom .

*Primary Examiner*—Patrick R. Salce
*Attorney, Agent, or Firm*—Cushman, Darby & Cushman

[57] ABSTRACT

A silicon controlled rectifier is provided to short circuit rapid surges or overloads in a power supply. The silicon controlled rectifier is turned off in normal use with two equal and opposite biases applied to the control terminal. Signals from overload or rapid surge detecting circuits cancel the bias which tends to turn off the silicon controlled rectifier whereby the opposite bias causes the silicon controlled rectifier to short circuit.

7 Claims, 4 Drawing Figures

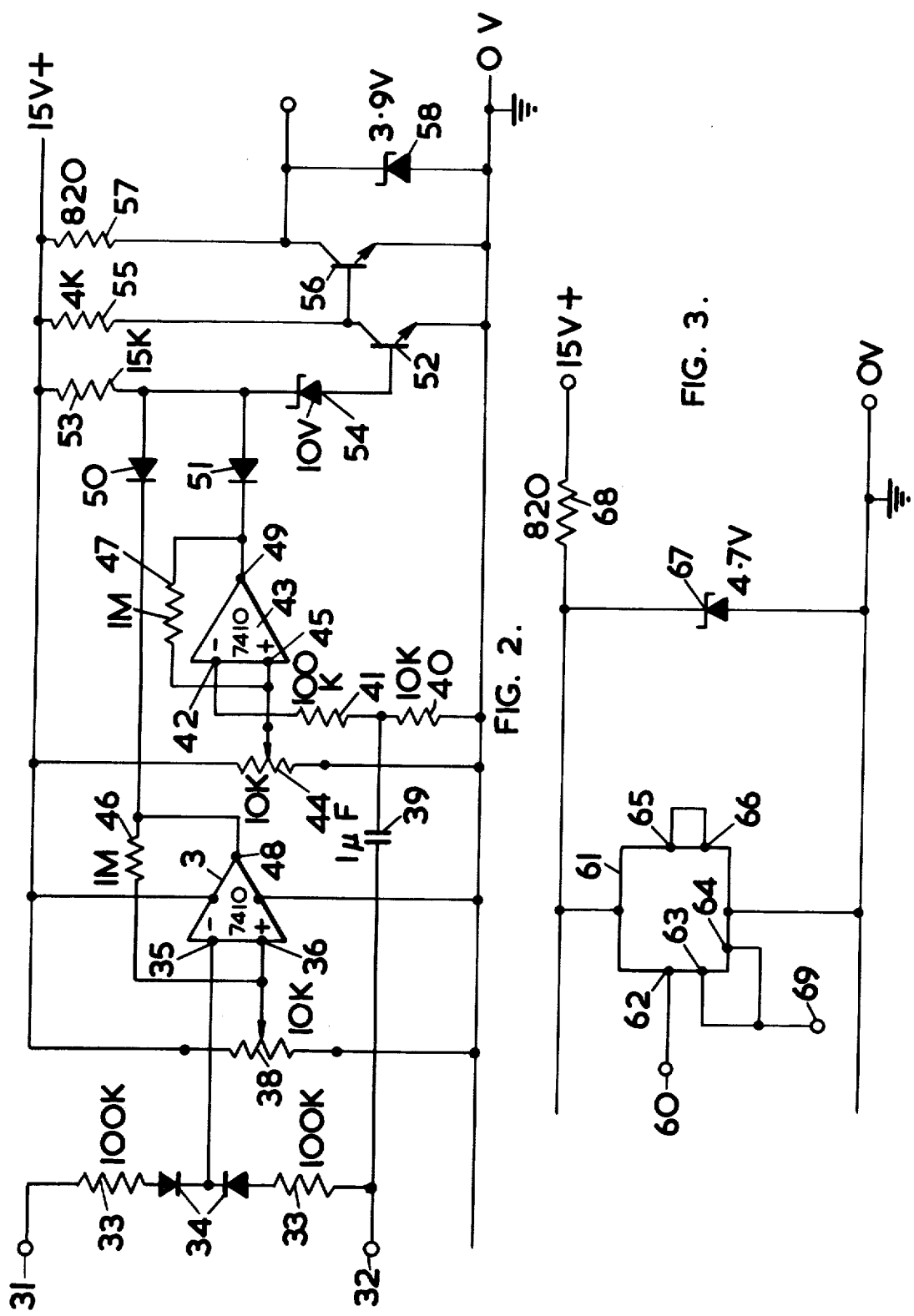

MEANS FOR PROTECTING HAZARDOUS AREAS AGAINST ELECTRICAL FAULTS

This invention relates to protection against electrical faults in areas subject to for example fire or explosion hazards. The invention is particularly directed towards means for restricting transient or continuous electrical overloads taking place on power supply lines feeding equipment whose nature or environment is explosive, inflammable or capable of being damaged by electrical power surges.

Known methods of electrical surge protection are based on devices which change their physical or electronic state when experiencing current or voltage increases. Thus fusewire melts when carrying excess current and the resistance of neon regulator tubes falls at a particular voltage threshold. Devices such as capacitors, inductors, gas-filled thermionic tubes and zener diodes have been used to inhibit electrical transients, and various types of circuit breakers, for example relays, are commonly employed to break circuits carrying excessive current. Traditional circuit breaking techniques are relatively slow in operation, a typical relay for example will open 20 milliseconds after activation. The difficulty of rapidly interrupting a high current is a generally recognised electrical engineering problem, since high current circuit breakers need to be ruggedly constructed and are therefor slow in operation. These considerations led to the development of the thyristor or silicon controlled rectifier, hereinafter referred to as an SCR, and its employment in the so-called crowbar circuit.

An SCR is a three terminal, solid state device which permits current to flow in one direction between two of its terminals when a control voltage is applied to the third terminal. The device may be switched on in microseconds and can carry currents up to the order of 1,000 Amps. Once switched on, the SCR stays on until the current through it falls to zero, irrespective of the control voltage. For this reason, the SCR is ineffective as a DC circuit-breaker, but has been used in the crowbar circuit to operate a circuit breaking relay. The crowbar technique employs a sensing circuit to detect electrical overloads and to switch on an SCR in response thereby triggering a circuit breaking relay. It is generally difficult to arrange relays to open in response to small overloads and furthermore the crowbar is not in widespread use despite its usefulness, because the switching time is limited by the relay speed.

Areas containing flame or explosion hazards are frequently supplied with electrical power at currents exceeding 100 Amps. The consequence of transient or continuous increases in the electrical current or voltage supplied to those areas may be severe if such increases are due to malfunctions. Fires or explosions may be initiated within the 20 milliseconds or more that elapse before a relay or other device operates. This is particularly true of, for example, the power supplies used in the testing of weapons systems. Torpedo and missile weapon systems require periodic testing to ensure operational readiness, whereas operational reliability and weight considerations dictate that fusing or other protective circuitry within the projectile be avoided. Power supply malfunction or overload is also an ever present hazard in inflammable or explosive industrial environments. It is an object of this invention to provide a device which operates in such a manner and with sufficient speed to forestall the consequences of electrical malfunction in potentially hazardous situations.

According to the present invention an electrical safety device for fail-safe protection of an electrical system against electrical transients, which device comprises an SCR activatable to provide a short circuit for hazard isolation purposes, a first biassing circuit arranged to supply a first bias signal capable of switching on the SCR and a second biassing circuit arranged to supply a second SCR bias signal equal in magnitude and of opposite polarity to the first bias signal so that in normal use the SCR is off, the second biassing circuit being operative to remove the second bias signal in response to an input thereto of an electrical transient signal having a rate of change in excess of a threshold value whereupon the first bias signal switches on the SCR to provide the short circuit for hazard isolation.

The second biassing electronic sensing circuit may also be arranged to be responsive to currents and voltages exceeding by a predetermined proportion the normal power requirements of an electrically sensitive area.

The electronic sensing circuit is particularly suitable for sensing electrical transient signals appearing on the electrical power lines supplying an electrically sensitive area.

A preferred embodiment of the electronic sensing circuit comprises a configuration of electronic integrated circuits detecting current and voltage overloads and electrical transients to provide a control signal for an SCR.

In order that the invention may be more fully understood, one embodiment thereof will now be described, by way of example only, with reference to the accompanying FIGS. 1 to 4 in which:

FIG. 2 illustrates a practical fault sensing circuit.

FIG. 3 illustrates an electronic latching circuit in accordance with the invention.

Figure 1:
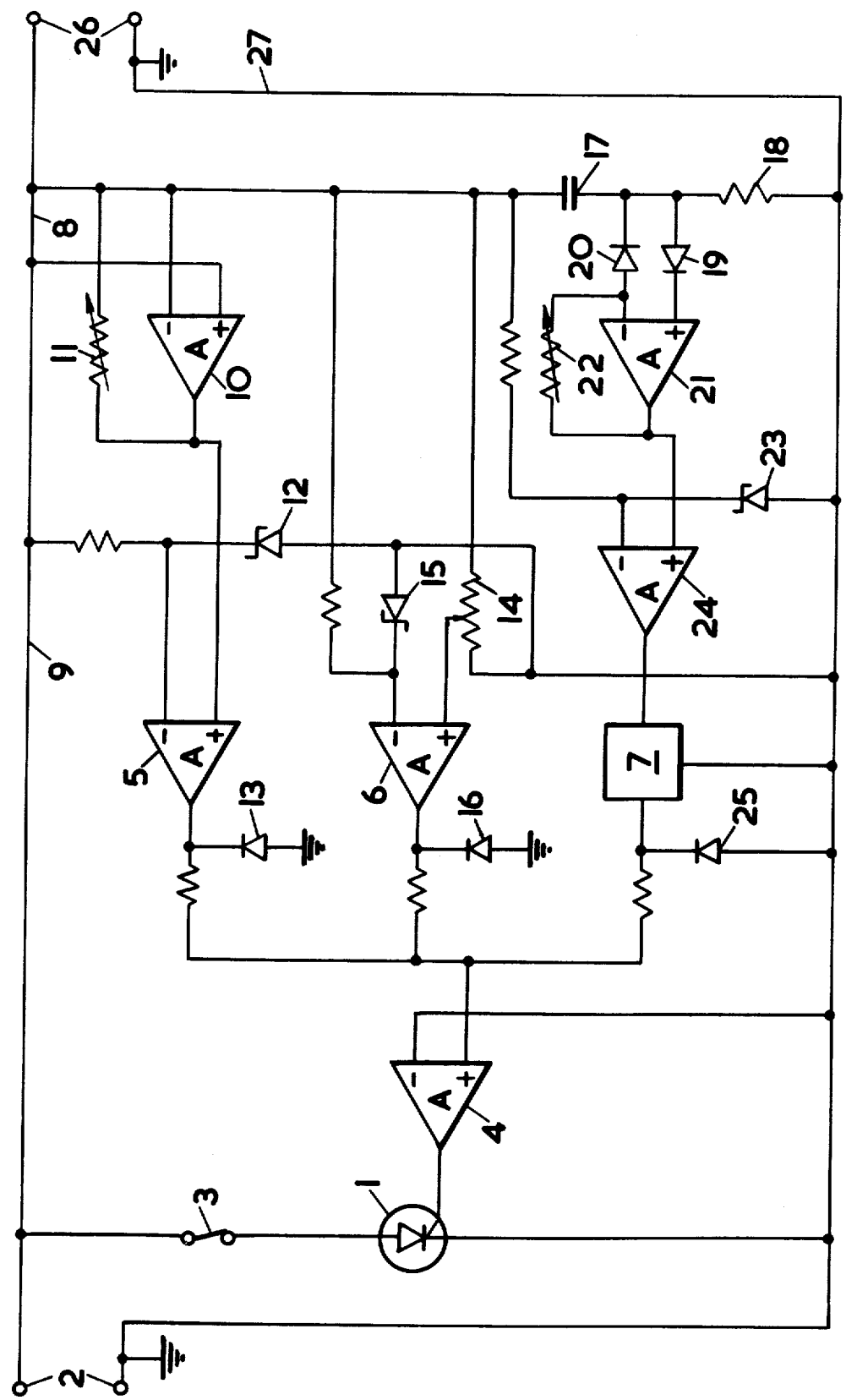
FIG. 1 is a schematic diagram of an SCR and control circuit.

FIG. 1 illustrates the basic principles of detecting electrical faults and triggering a protective SCR in response thereto. The apparatus shown in FIG. 1 does not however possess the fail-safe features of the present invention to be described with reference to FIGS. 2 to 4. In FIG. 1, electrical power is supplied across an SCR 1 via input terminals 2. The SCR 1 is in series with a normally closed resetting switch 3. The SCR 1 is activated by the output of an operational amplifier 4. The amplifier 4 sums the outputs of operational amplifiers 5 and 6 and a multivibrator 7. The potential difference across a short length 8 of a power-supply line 9 is amplified by an operational amplifier 10 with a gain set by a variable resistor 11 giving a signal proportional to the current flowing in the line 9. The amplifier 5 amplifies the difference between the output of the amplifier 10 and the voltage generated by a zener diode 12. The zener diode 12 generates a voltage corresponding to the maximum permitted current in the line 9. When the output of the amplifier 10 exceeds the voltage on the zener diode 12, the output of the amplifier 5 swings positive to switch on the SCR 1 via the amplifier 4. Negative outputs of the amplifier 5 are shorted to earth by the diode 13. A potentiometer 14 provides a fraction of the voltage on the line 9 for comparison with the voltage on a zener diode 15. When the line voltage exceeds voltage on zener diode 15, the output of the amplifier 6 swings positive to switch on the SCR 1 via the amplifier 4. Negative outputs of the amplifier 6 are shorted to earth via the diode 16. Transient voltages appearing on the line 9 are differentiated by a capacitor 17 a resistor 18 and fed via diodes 19 and 20 to an operational amplifier 21. The diodes 19 and 20 permit positive and negative going transients to reach the positive and negative inputs respectively of the amplifier 21, which consequently gives a positive output for either polarity of input transient. The gain and hence transient sensitivity of the amplifier 21 is controlled by the variable resistor 22. The voltage on the zener diode 23 is compared with the output of the amplifier 21 by an operational amplifier 24. When the output of the amplifier 21 exceeds the voltage on the zener diode 23 the output of the amplifier 24 swings positive to trigger the multivibrator 7 into its positive state, in which it stays irrespective of the transient voltage for a period long enough to switch on the SCR 1 via the amplifier 4. The negative output of the multivibrator is shorted to earth via the diode 25.

The action of the circuit of FIG. 1 is such as to short circuit the line 9 to earth via the SCR 1 in response to current excess, voltage excess or transient voltages, the circuit sensitivity to these phenomena being set by the variable resistor 11, the potentiometer 14 and the variable resistor 22. The circuit is provided with output terminals 26 and an SCR reset switch 3 to permit resetting subsequent to operation of the SCR 1.

A transmission line (not shown) takes power via the line 9 and earth return 27 to remotely situated equipment in a hazardous environment. When the control circuit switches on the SCR 1, current previously flowing in the line 9 is rerouted through the SCR 1. Malfunction in the hazardous area thus results in electrical power being diverted away from that area, and the speed of the SCR and control circuit is such that the malfunction is detected and power diverted before serious consequences can result.

The present invention provides for circuits of the kind illustrated in FIG. 1 to be modified to operate in a fail-safe manner, and hereinafter described.

Figure 4:
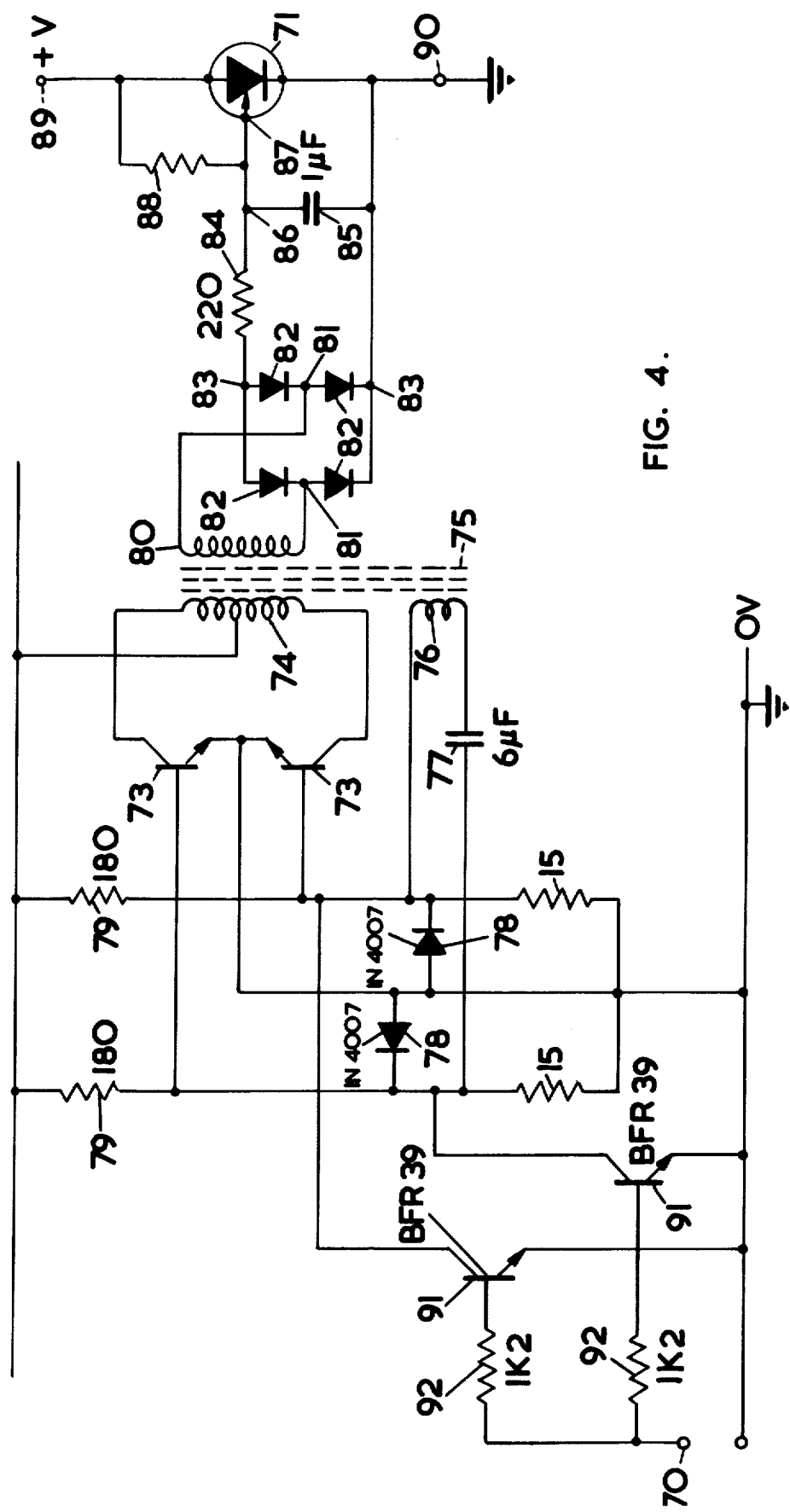
FIG. 4 illustrates a fail-safe SCR bias circuit.

The circuit shown in FIG. 1 is essentially a schematic or generalized representation of a practical circuit. FIGS. 2, 3 and 4 in combination illustrate a practical circuit incorporating fail-safe characteristics in accordance with the invention. FIG. 2 shows a sensing circuit by which current or voltage overloads and voltage transients may be detected, and FIG. 3 shows an electronic latching circuit capable of being triggered by a fault indication signal output from the sensing circuit of FIG. 2. FIG. 4 shows an SCR and associated biassing circuitry arranged such that the SCR is normally open-circuit. The state of the biassing circuitry is affected by the state of the latching circuit of FIG. 3 thereby giving control of the state of the SCR.

Referring in detail now to FIG. 2, current or voltage sensing inputs 31 and 32 are connected via resistors 33 and gating diodes 34 to the inverting input 35 of an operational amplifier 37. The signal on the inverting input 35 is compared by the amplifier 37 with that on the non-inverting input 36 preset on a potentiometer 38. The sensing input 32 is also connected to a differentiating network formed by a capacitor 39 and a resistor 40. The differentiating network is connected via a resistor 41 to the inverting input 42 of a second operational amplifier 43. The signal preset on a potentiometer 44 is fed to the non-inverting input 45 of the amplifier 43 to provide a reference for comparison with the differential signal on the inverting input 42. The amplifiers 37 and 43 are provided with respective feedback resistors 46 and 47, and the respective output terminals 48 and 49 are wired to diodes 50 and 51 connected to pass negative-going pulses only. The diodes 50 and 51 are connected into the base circuit of a transistor 52 arranged as a collector follower. The base circuit of the transistor also contains a current limiting resistor 53 and a voltage limiting zener diode 54. The transistor has a collector load resistor 55 and the output is connected to a second collector following transistor 56 wired to a collector load resistor 57. The output of the transistor 56 is limited to +3.9 volts by a zener diode 58.

Referring now also to FIG. 3, the output of the collector following transistor 56 is connected to the input 60 of an integrated circuit 61 comprising two Schmitt trigger circuits (not shown). Each Schmitt trigger circuit is provided with four inputs defined by diode gates internally of the integrated circuit 61. The input 60 is connected to an imput 62 of one Schmitt trigger circuit the output 63 of which is connected to an input 64 of the second Schmitt trigger circuit. The output 65 of the second Schmitt trigger circuit is connected to a second input 66 of the first Schmitt trigger circuit. A voltage regulating zener diode 67 and a resistor 68 reduce the 15 volt supply voltage to the 4.7 volts required by the integrated circuit 61. The output of the integrated circuit is taken from a terminal 69 connected to the input 64 of the second Schmitt trigger circuit and the output 63 of the first. When a negative-going pulse from the circuit of FIG. 1 reaches the input 60 of the integrated circuit 61, the input 62 of the first Schmitt trigger swings down and its output 63 swings up to switch on the second Schmitt trigger circuit. The input 64 of the second circuit accordingly swings up and its output 65 swings down to hold down the second input 66 of the first Schmitt trigger, thus "latching" both Schmitt trigger circuits with the terminals 63 and 64 in the upper voltage state and terminals 65 and 66 in the lower. The "latched" state persists even if the voltage on the input 60 is reduced, and the circuit can only be reset by connecting the output 69 to earth.

Referring now also to FIG. 4, the output 69 of FIG. 3 is connected to the input 70 of an oscillator-controlled bias circuit for an SCR 71. The oscillator comprises two transistors 73 in a push-pull arrangement. The oscillator output is connected across the centre-tapped primary coil 74 of a transformer 75. Positive feedback for the oscillator is provided by means of a transformer secondary coil 76, and the oscillatory frequency is determined by the inductance of the coil 76 in combination with a 6 μF capacitor 77. Diodes 78 each define a current feedback circuit to a respective transistor 73. Bias current is supplied to the transistors 73 via resistors 79. The transformer 75 is provided with another secondary coil 80 connected across the input terminals 81 of a bridge rectifier arrangement of diodes 82. The bridge rectifier output terminals 83 are connected to supply a negative full-wave rectified signal to a smoothing circuit comprising a resistor 84 and a capacitor 85. The output terminal 86 of the smoothing circuit is connected to the gate terminal 87 of the SCR 71. A bias resistor 88 is connected to supply a positive signal to the gate terminal 87.

The oscillator circuit shown in FIG. 4 is connected to be normally in oscillation and thereby normally supplies a negative signal to the gate terminal 87 of the SCR 71 via the circuit of the secondary coil 80. This negative signal is equal in magnitude to, and therefore cancels out the positive bias supplied to the SCR 71 via the bias resistor 88, and hence the SCR 71 is normally in the open-circuit state providing a large resistance between terminals 89 and 90. The oscillator may be switched off by means of switching transistors 91 which have base circuit resistors 92 connected to the input 70. When a positive-going signal is supplied to the input 70, the switching transistors 91 short-circuit the bases of the transistors 73 to earth, thereby interrupting oscillation. This removes the negative bias on the gate terminal 87 of the SCR 71, and the positive bias supplied via the resistor 88 switches on the SCR 71 short circuiting together the terminals 89 and 90.

The collective operation of the circuits of FIGS. 2, 3 and 4 is as follows. Signals proportional to the current and voltage carried by a power cable are derived by conventional means (see eg FIG. 1) and fed to the inputs 31 and 32. When current and voltage overload protection together with current transient protection are required, the current signal is connected to input 32 and the voltage signal is connected to input 31. Alternatively, if voltage (instead of current) transient protection is required, the foregoing connections to inputs 31 and 32 are reversed. Consider the effect of the signals appearing at the inputs 31 or 32 of the circuit of FIG. 2. A sufficiently large current or voltage overload will give a negative output pulse from the operational amplifier 37. Similarly, a sufficiently rapidly increasing transient signal (whether current-derived or voltage-derived) on the input 32 will be differentiated by the circuit formed by the capacitor 39 and the resistor 40 to drive the operational amplifier 43 to give a negative output also. Any one of these fault conditions therefore supplies a negative output pulse which is routed via the collector following transistors 52 and 56 to the integrated circuit 61. The circuit 61 latches up on receipt of a negative input pulse, and therefore the switching transistors 91 are clamped in the short-circuit state interrupting the oscillator circuit of FIG. 3. This action removes the negative bias from the gate terminal 87 of the SCR 71, which is then switched to the short circuit state by the positive bias signal supplied via the bias resistor 88.

The terminals 89 and 90 thus shorted together are connected across a supply it is required to interrupt as shown for example in FIG. 1.

The inputs 31 and 32 receive fault signals derived from the current and voltage in that supply. The combination of FIGS. 2, 3 and 4 is sensitive to both electrical current and voltage overloads or transients on a power line (such as, for example, the power supply line 9 in FIG. 1), and the use of an oscillator to supply an SCR bias signal gives fail-safe properties.

We claim:

1. An electrical safety device for fail-safe protection of an electrical system against electrical transients, which device comprises an SCR to provide a short circuit for hazard isolation, a first biassing circuit arranged to supply a first bias signal capable of switching on the SCR and a second biassing circuit arranged to supply a second SCR bias signal equal in magnitude and of opposite polarity to the first bias signal so that in normal use the SCR is off, the second biassing circuit being operative to remove the second bias signal in response to an input thereto of an electrical transient signal having a rate of change in excess of a threshold value so that the first bias signal switches on the SCR to provide the short circuit for hazard isolation.

2. An electrical safety device according to claim 1 in which the second biassing circuit includes solid state integrated amplifiers connected to compare the rate of change of the electrical transient signal with a predetermined threshold value and to generate a fault indication signal when the predetermined value is exceeded.

3. An electrical safety device according to claim 2 including an electronic latching circuit responsive to the fault indication signal.

4. An electrical safety device according to claim 1 in which the second biassing circuit includes an oscillator coupled to rectification and smoothing means, whereby in operation of the device, the output of the oscillator is rectified and smoothed to provide the second bias signal.

5. An electrical safety device according to claim 4 in which the second biassing circuit includes solid state integrated amplifiers connected to compare the rate of change of the electrical transient signal with a predetermined threshold value and to generate a fault indication signal when the predetermined value is exceeded.

6. An electrical safety device according to claim 5 including an electronic latching circuit responsive to the fault indication signal.

7. An electrical safety device for fail-safe protection of an electrical system against electrical transients, which device comprises an SCR to provide a short circuit for hazard isolation, a first biassing circuit arranged to supply a first bias signal capable of switching on the SCR and a second biassing circuit arranged to supply a second SCR bias signal equal in magnitude and of opposite polarity to the first bias signal so that in normal use the SCR is off, the second biassing circuit being operative to remove the second bias signal in response to an input thereto of an electrical transient signal having a rate of change in excess of a predetermined threshold value and also the second biassing circuit being operative to remove the second bias signal in response to overloads in current or voltage when indicated by corresponding signals applied as inputs thereto whereupon the first bias signal switches on the SCR to provide the short circuit for hazard isolation.

* * * * *